United States Patent
Amante et al.

(10) Patent No.: US 9,038,952 B2
(45) Date of Patent: May 26, 2015

(54) ATTACHMENT DEVICES FOR ROTORCRAFT FRONT WINDSHIELD

(71) Applicant: Bell Helicopter Textron Inc., Fort Worth, TX (US)

(72) Inventors: William A. Amante, Grapevine, TX (US); Carl A. May, Mansfield, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 167 days.

(21) Appl. No.: 13/744,484

(22) Filed: Jan. 18, 2013

(65) Prior Publication Data

US 2013/0206911 A1  Aug. 15, 2013

Related U.S. Application Data

(60) Provisional application No. 61/633,410, filed on Feb. 10, 2012.

(51) Int. Cl.
*B64C 1/14*     (2006.01)
*B61C 1/00*     (2006.01)
*B64C 27/04*    (2006.01)

(52) U.S. Cl.
CPC ............ *B61C 1/00* (2013.01); *B64C 1/1492* (2013.01); *B64C 27/04* (2013.01)

(58) Field of Classification Search
USPC ............ 244/129.3, 129.1, 121, 131; 411/542; 296/84.1, 96.21, 96.22
See application file for complete search history.

(56) References Cited

U.S. PATENT DOCUMENTS

| | | | |
|---|---|---|---|
| 2,834,998 A * | 5/1958 | Wilder | 52/208 |
| 3,382,630 A | 5/1968 | Chivers | |
| 3,510,087 A | 5/1970 | Strickland | |
| 3,756,551 A * | 9/1973 | Bishop | 267/141.1 |
| 4,295,691 A * | 10/1981 | Rubenthaler | 384/297 |
| 4,732,519 A * | 3/1988 | Wagner | 411/337 |
| 4,975,008 A * | 12/1990 | Wagner | 411/337 |
| 5,027,567 A * | 7/1991 | Roberts | 52/57 |
| 5,096,255 A * | 3/1992 | Leischner | 296/201 |
| 5,366,577 A * | 11/1994 | Hart et al. | 156/222 |
| 5,662,444 A * | 9/1997 | Schmidt, Jr. | 411/369 |

(Continued)

FOREIGN PATENT DOCUMENTS

| | | |
|---|---|---|
| DE | 19836107 A1 | 2/2000 |
| DE | 102009040277 | 3/2011 |

(Continued)

OTHER PUBLICATIONS

Official Action in related European Application No. 13153925.6, dated Jan. 27, 2014, 5 pages.

(Continued)

*Primary Examiner* — Tien Dinh
*Assistant Examiner* — Michael A Fabula
(74) *Attorney, Agent, or Firm* — Christopher S. Storm; Bell Helicopter Textron Inc.

(57) ABSTRACT

According to one embodiment, a windshield attachment device for coupling a windshield to a body includes a fastener portion, a bolt, and an elastomeric load isolator. The fastener portion has an opening therethrough. The bolt is configured to extend through the opening of the fastener portion and couple the fastener portion to the body. The elastomeric load isolator surrounds at least a portion of the fastener portion and separating the fastener portion from the windshield.

18 Claims, 6 Drawing Sheets

(56) References Cited

U.S. PATENT DOCUMENTS

| | | | |
|---|---|---|---|
| 6,059,503 A * | 5/2000 | Johnson | 411/353 |
| 6,280,132 B1 * | 8/2001 | Szczukowski et al. | 411/353 |
| 6,328,513 B1 * | 12/2001 | Niwa et al. | 411/339 |
| 6,467,225 B1 * | 10/2002 | Shimomura | 52/204.5 |
| 7,686,554 B2 * | 3/2010 | Amann et al. | 411/352 |
| 2008/0271857 A1 | 11/2008 | Swadling | |

FOREIGN PATENT DOCUMENTS

| | | |
|---|---|---|
| FR | 1537215 A | 8/1968 |
| GB | 491358 | 8/1938 |
| GB | 2028748 | 3/1980 |

OTHER PUBLICATIONS

European Search Report in related European Application No. 13153926.4, dated Mar. 28, 2013, 7 pages.

European Search Report in related European Application No. 13153925.6, dated Apr. 5, 2013, 8 pages.

Official Action in related European Application No. 13153925.6, dated Jun. 13, 2014, 4 pages.

Summons to Attend Oral Proceedings in related European Application No. 13153926.4, dated Jun. 12, 2014, 7 pages.

Official Action in related European Application No. 13153926.4, dated Oct. 9, 2013, 6 pages.

Picture of Elisport CH-7 Kompress, Radom Air Show 2007, Wikipedia.com, accessed Oct. 1, 2013.

Office Action in related Canadian Application No. 2,804,330, dated May 13, 2014, 4 pages.

Office Action in related Canadian Application No. 2,804,324, dated May 12, 2014, 4 pages.

Official Action in related Chinese Application No. 201310051378.X, dated Dec. 1, 2014, 9 pages.

Office Action in related U.S. Appl. No. 131744,472, dated Sep. 8, 2014, 47 pages.

Official Action in related Chinese Application No. 201310051373.X, dated Dec. 16, 2014, 10 pages.

* cited by examiner

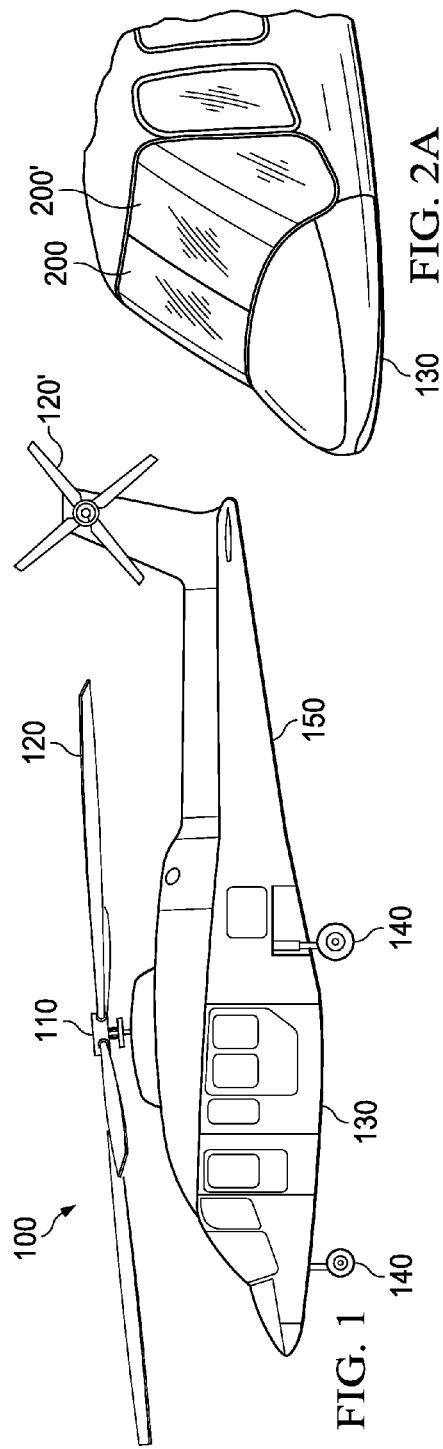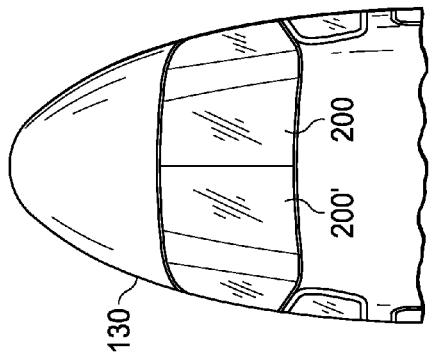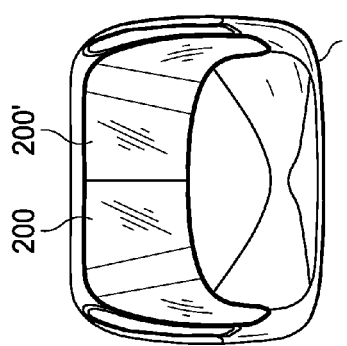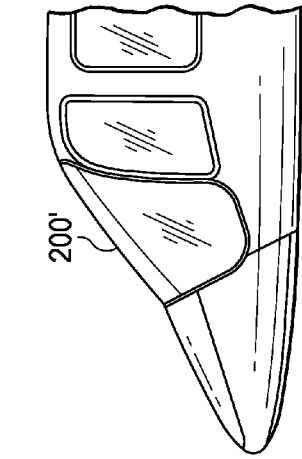

ATTACHMENT DEVICES FOR ROTORCRAFT FRONT WINDSHIELD

RELATED APPLICATIONS

Pursuant to 35 U.S.C. §119 (e), this application claims priority to U.S. Provisional Patent Application Ser. No. 61/663,410, entitled HELICOPTER FRONT WINDSHIELDS, filed Feb. 10, 2012. U.S. Provisional Patent Application Ser. No. 61/663,410 is hereby incorporated by reference.

TECHNICAL FIELD

This invention relates generally to aircraft windshields, and more particularly, to attachment devices for a rotorcraft front windshield.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

A rotorcraft may include a variety of windows. Some of these windows may allow the pilot to see outside the rotorcraft. Two examples of a rotorcraft window may include a front windshield and a chin window. A chin window may allow a pilot to see a portion of the ground proximate to the rotorcraft when the rotorcraft is operating near the ground.

SUMMARY

Particular embodiments of the present disclosure may provide one or more technical advantages. A technical advantage of one embodiment may include the capability to eliminate the chin window from a conventional rotorcraft. A technical advantage of one embodiment may include the capability to improve pilot visibility. A technical advantage of one embodiment may include the capability to improve safety in the event of a crash. A technical advantage of one embodiment may include the capability to protect against birdstrikes.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 1 shows a rotorcraft according to one example embodiment;

FIG. 2A shows a perspective view of the nose portion of the rotorcraft of FIG. 1 according to one example embodiment;

FIG. 2B shows a side view of the nose portion of FIG. 2A;

FIG. 2C shows a front view of the nose portion of FIG. 2A;

FIG. 2D shows a top view of the nose portion of FIG. 2A;

FIG. 5A shows a perspective view of windshield 200, FIG. 5B shows a detailed perspective view of an attachment device 400 installed in an opening 500, and FIG. 5C shows a cross-section view of the attachment device 400 of FIG. 5B installed in opening 500.

DETAILED DESCRIPTION OF THE DRAWINGS

Figure 3:
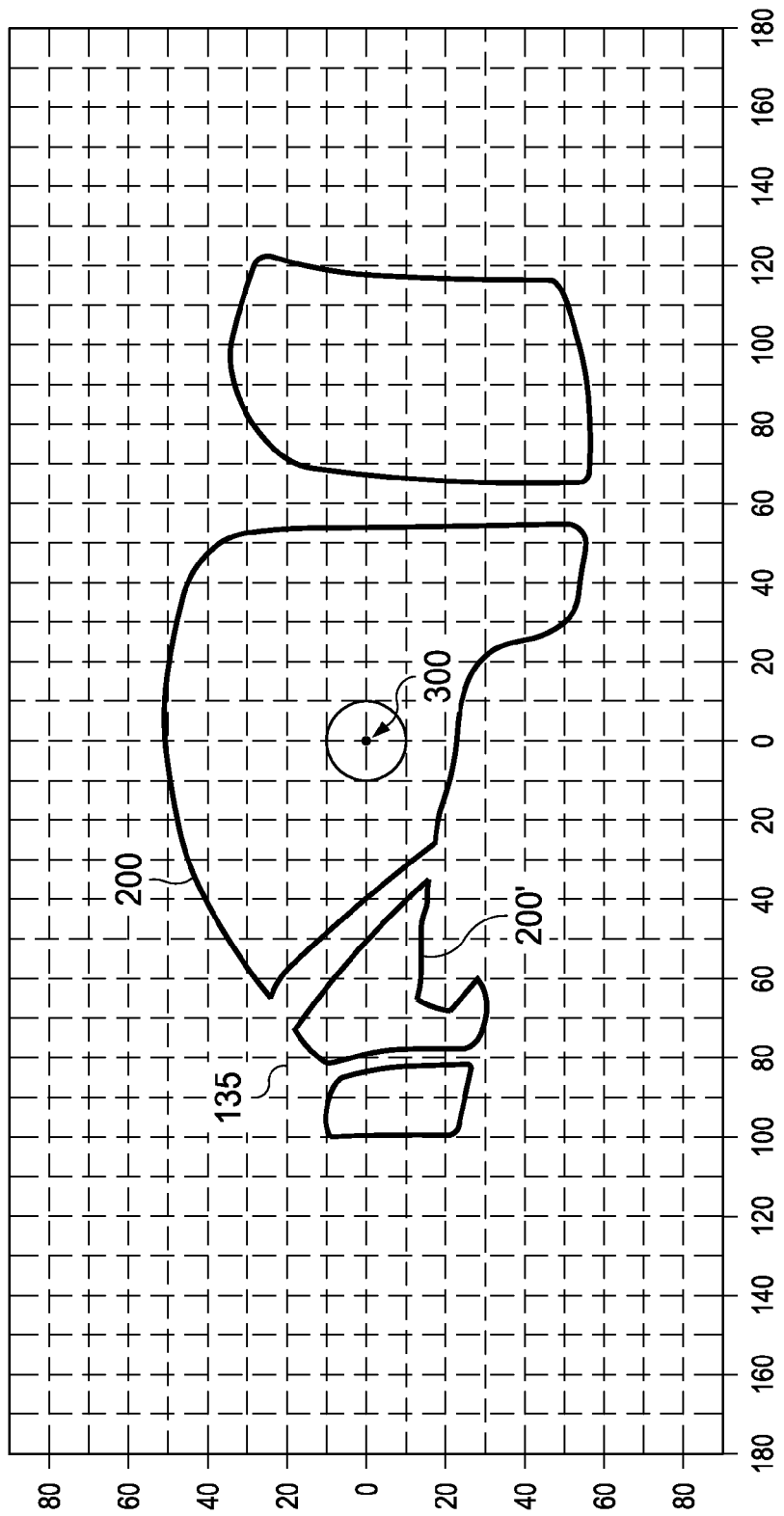
FIG. 3 shows a two-dimensional rectilinear field-of-view graph of the shape of the windshield of FIGS. 2A-2D according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

The pilot of a rotorcraft may be asked to perform a variety of maneuvers near the ground or other obstacles. Examples of such maneuvers may include take-off and landing. In these examples, it may be important for the pilot to have visibility of both the area in front of the rotorcraft and the ground proximate to the rotorcraft when the rotorcraft is operating near the ground.

Typically, a rotorcraft is configured with two windows to provide these views: a front windshield providing visibility in front of the rotorcraft, and a separate chin window providing visibility of the ground proximate to the rotorcraft when the rotorcraft is operating on the ground. This separate chin window is typically provided near the legs/feet of the pilot in order to provide a viewing angle of the ground proximate to the rotorcraft when the rotorcraft is operating on the ground.

This separate chin window, however, may raise a number of issues. First, the pilot may not have a clear line-of-sight to look through the chin window. For example, the foot pedals, instrument panel, and pilot's legs and feet may all block the pilot's ability to look through the chin window. In addition, the chin window may raise safety concerns in the event of a crash because of its location. In particular, the chin window may break when the rotorcraft "ditches" in bodies of water and cause shattered glass and water to enter the cockpit at a dangerously high velocity. Furthermore, the chin window may take valuable space within the aircraft since nothing can block its view if it is to maintain its functionality. The limited space where the chin window is located is very valuable and may be better suited for other equipment, such as floatation kits.

Accordingly, teachings of certain embodiments recognize the capability to eliminate the chin window from a rotorcraft. In particular, teachings of certain embodiments recognize the capability to provide a front windshield that provides visibility of both the area in front of the rotorcraft and the ground proximate to the rotorcraft when the rotorcraft is operating near the ground.

For example, the rotorcraft 100 of FIG. 1 shows a front windshield that provides visibility of both the area in front of the rotorcraft and the ground proximate to the rotorcraft when the rotorcraft is operating near the ground. FIGS. 2A-2D show detailed views of the nose portion of the rotorcraft 100 of FIG. 1. FIG. 2A shows a perspective view, FIG. 2B shows a side view, FIG. 2C shows a front view, and FIG. 2D shows a top view.

As seen in FIGS. 2A-2D, rotorcraft 100 features two front windshields 200 and 200'. Each front windshield 200/200' wraps from the front of body 130 around to the side of body 130. In this example, the front-facing portion of each front windshield provides visibility of the area in front of the rotorcraft, and the side-facing portion of each front windshield provides visibility of the ground proximate to the rotorcraft when the rotorcraft is operating near the ground.

In addition, eliminating any post between the front-facing and side-facing portions of front windshields 200 and 200' may increase flexibility of front windshields 200 and 200' and improve the ability of front windshields 200 and 200' to withstand birdstrikes. For example, front windshields 200/200' may receive impact of a birdstrike and then allow this energy to propagate without shattering the windshield due to large shear stresses that develop where the windshield attaches to structure or posts.

FIG. 3 shows a two-dimensional rectilinear field-of-view graph of the shape of windshield 200 according to one example embodiment. The origin of the graph of FIG. 3 is based on design eye point 300. A design eye point may represent a design reference point representative of a designed location of a pilot's eye. Each aircraft may have one or more design eye points. For example, a design eye pilot may exist for each pilot, and each pilot may have more than one design eye point (e.g., a design range or area).

Aircraft components, such as the windshields and instrumentation panel, may be designed at least in part relative to this design eye point. For example, in some embodiments, the design eye point may represent the optimum location for visibility, inside and/or outside the cockpit, as well as the optimum position for access to the aircraft instruments. Some aircraft manufacturers may provide reference markers for pilots to use while making seat adjustments; the intent of these reference markers may be to have the pilot adjust the seat in order for the eyes of the pilot to be at or near the design eye point. Although the example of FIG. 3 refers to a design eye point, teachings of certain embodiments recognize that other reference points may be used. In addition, although FIG. 3 refers to a single design eye point 300, design eye point 300 may be representative of multiple design eye points (e.g., a design range or area).

In the example of FIG. 3, windshields 200 and 200' are viewed from the right pilot seat inside rotorcraft 100. Although FIG. 3 shows a two-dimensional representation, the three-dimensional location of design eye point 300 would be a distance away from windshield 200 inside the aircraft because that is where the pilot is located (at least, according to design).

Coordinates in FIG. 3 may be identified by reference to the location of design eye point 300 within rotorcraft 100. Thus, for example, coordinates to the left of design eye point 300 are those coordinates left of the pilot from the pilot's perspective (and to the left of design eye point 300 in FIG. 3). In addition, coordinates to the right of design eye point 300 are those coordinates right of the pilot from the pilot's perspective (and to the right of design eye point 300 in FIG. 3). Furthermore, windshield 200' may be a mirror-image of windshield 200. Thus, coordinates to the right of design eye point 300 of windshield 200 may be to the left of design eye point 300' of windshield 200'.

In the example of FIG. 3, windshield 200 includes coordinates at a first point located twenty degrees above and forty degrees to the (right) side of design eye point 300 and a second point located thirty degrees below and forty degrees to the same side of design eye point 300 as the first point (the right side). As seen in FIG. 3, windshield 200 includes translucent material (e.g., glass) extending continuously between the first and second points.

Furthermore, the example windshield 200 of FIG. 3 may include translucent material that continuously extends from the first and second points to additional coordinates. For example, in some embodiments, the translucent material extends continuously to a point located twenty degrees above and forty degrees to the side of the design reference point opposite the first and second points (the left side in FIG. 3). As another example, in some embodiments, the translucent material extends continuously to a point located forty degrees above and forty degrees to the same side of the design reference point as the first and second points (the right side in FIG. 3). As yet another example, in some embodiments, the translucent material extends continuously to a point located fifty degrees below and fifty degrees to the same side of the design reference point as the first and second points (the right side in FIG. 3). As yet another example, in some embodiments, the translucent material extends continuously to a point located thirty-five degrees above and forty degrees to the side of the design reference point opposite the first and second points (the left side in FIG. 3). As yet another example, in some embodiments, the translucent material extends continuously to a point located ten degrees below and twenty degrees to the side of the design reference point opposite the first and second points (the left side in FIG. 3).

Although different embodiments of windshield 200 may include different coordinates, teachings of certain embodiments recognize that windshield 200 may be of a limited size while still providing visibility of both the area in front of the rotorcraft and the ground proximate to the rotorcraft when the rotorcraft is operating near the ground. For example, windshield 200 is not a glass canopy that fully surrounds the cockpit (such as found on the Bell 47). Rather, windshield 200 is bounded by and fixably coupled to the frame of body 130.

Thus, in the example of FIG. 3, a variety of coordinates may fall outside the boundaries of windshield 200. For example, as seen in FIG. 3, windshield 200 does not include translucent material that continuously extends to a point located twenty degrees above and seventy degrees to the side of the design reference point opposite the first and second points (the left side of FIG. 3). Rather, this coordinate is occupied by the center post 135 that separates windshield 200 from windshield 200'.

As explained above, windshields 200 and 200' are coupled to body 130. Coupling windshields 200 and 200' to body 130, however, may subject windshields 200 and 200' to a risk of cracking. For example, in some embodiments, windshields 200 and 200' have a higher coefficient of thermal expansion than body 130. In this example, temperature changes may cause windshield 200 and/or 200' to crack. In another example, windshields 200 and 200' may be subject to external loads (e.g., from a birdstrike), and windshields 200 and 200' crack when transferring forces to body 130. Accordingly, teachings of certain embodiments recognize the capability to couple windshields 200 and 200' to body 130 while protecting against thermal expansion and isolating external loads from body 130.

Figure 4A:
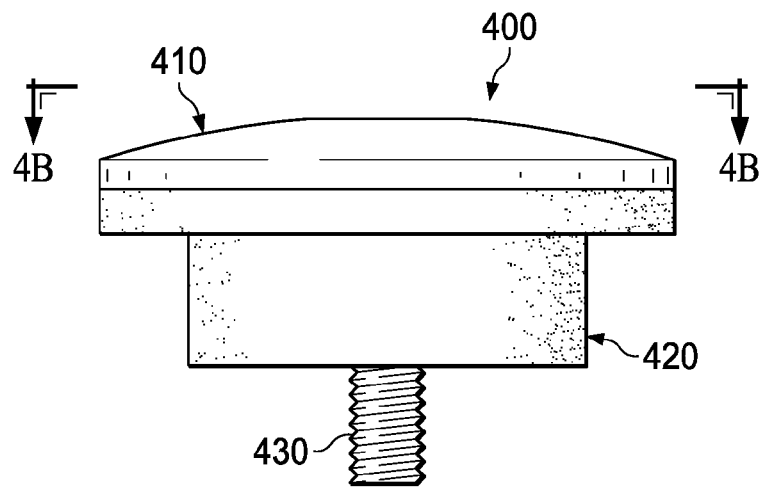
FIG. 4A shows an assembled side view of an attachment device for attaching the windshield of FIG. 3 to the rotorcraft of FIG. 1 according to one example embodiment.
Figure 4B:
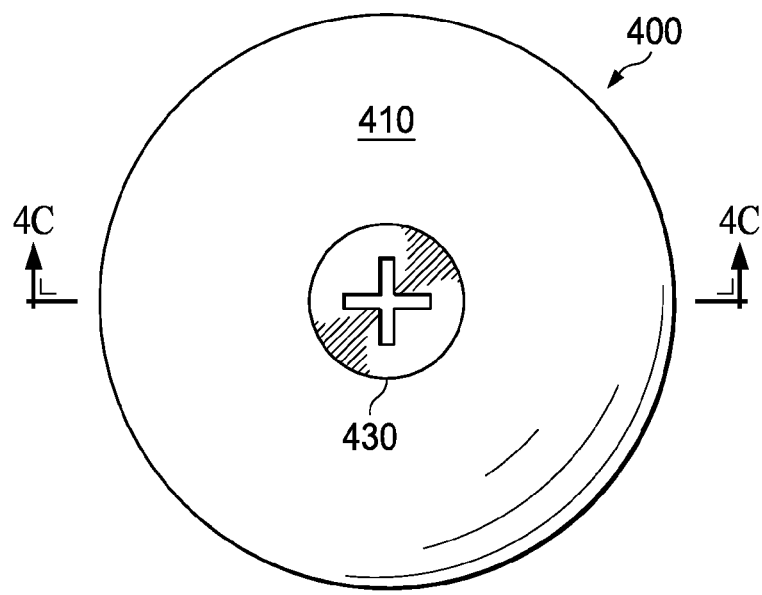
FIG. 4B shows an assembled top view of the attachment device 400 of FIG. 4A.
Figure 4C:
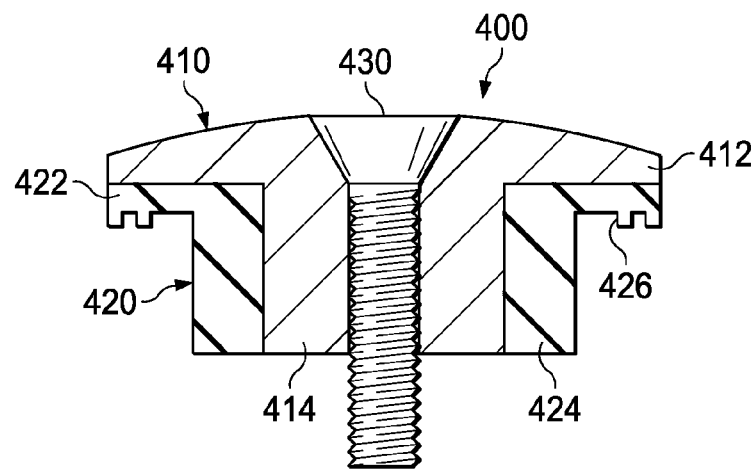
FIG. 4C shows a cross-section side view of the attachment device 400 of FIG. 4A.
Figure 4D:
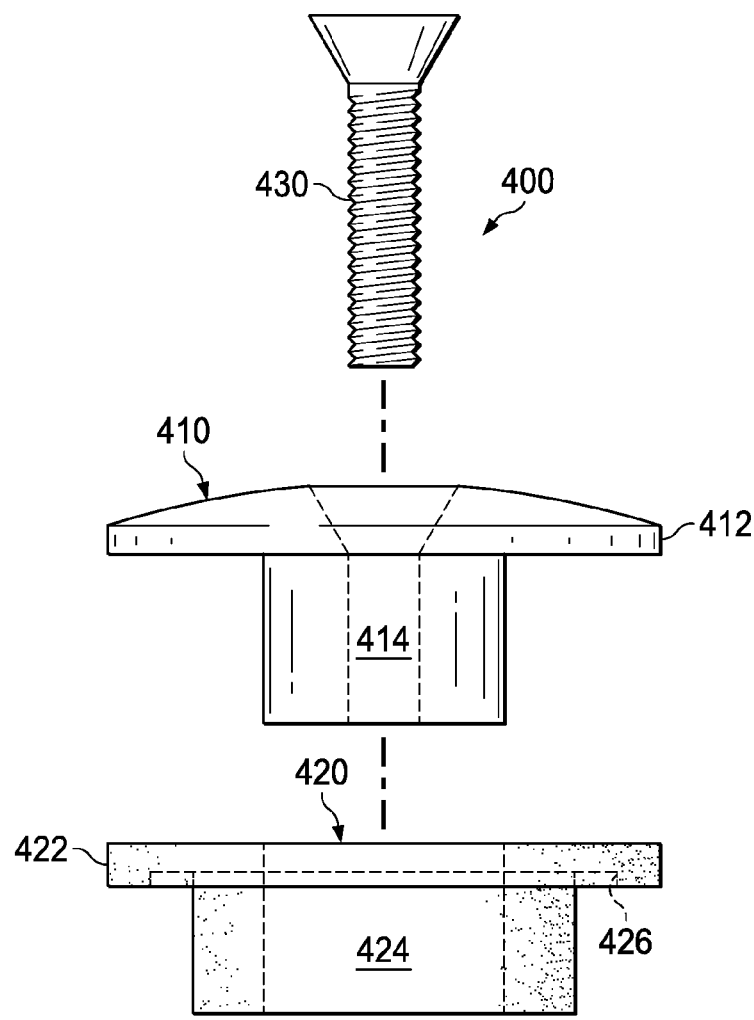
FIG. 4D shows a disassembled side view of the attachment device 400 of FIG. 4A.

FIGS. 4A-4D show an attachment device 400 according to one example embodiment. FIG. 4A shows an assembled side view of attachment device 400, FIG. 4B shows an assembled top view of attachment device 400, FIG. 4C shows a cross-section side view of attachment device 400, and FIG. 4D shows a disassembled side view of attachment device 400. In operation, as will be explained in greater detail below, windshields 200 and 200' may be attached to body 130 using attachment devices 400.

As seen in FIGS. 4A-4D, attachment device 400 features three primary components: a fastener portion 410, an elastomeric load isolator 420, and a bolt 430. Fastener portion 410 has an opening therethrough that is configured to receive bolt 430. Fastener portion 410 may be made from any suitable material, including both metallic and non-metallic materials. In some embodiments, fastener portion 410 is plastic, such as a thermoplastic or thermoset. In one example embodiment, fastener portion 410 is carbon fiber. In some embodiments, fastener portion 410 is formed from an injection-molding process. For example, fastener portion 410 may injection-molded using a nylon 6-6 composition with 40% fiberglass.

As seen in the example of FIG. 4C, fastener portion 410 may include a head portion 412 and a body portion 414. In some embodiments, head portion 412 may be configured to retain windshield 200 against body 130, and body portion 414 may be configured to reside within an opening in windshield 200.

Elastomeric load isolator 420 surrounds fastener portion 410 and separates fastener portion 410 from windshield 200. Elastomeric load isolator 420 may help manage forces that may be transmitted between body 130 and windshield 200. For example, elastomeric load isolator 420 may help distribute shear stresses over a larger and softer area. In addition, elastomeric load isolator 420 may help prevent windshield 200 from being subject to vibrations of body 130 or prevent windshield 200 from exerting forces on body 130, such as forces due to birdstrikes or thermal expansion. Teachings of certain embodiments recognize that managing and/or limiting the transfer of forces between body 130 and windshield 200 may reduce failures in windshield 200.

As seen in the example of FIG. 4C, elastomeric load isolator 420 may include a head portion 422 and a body portion 424. In some embodiments, head portion 422 may separate head portion 412 from windshield 200, and body portion 424 may separate body portion 414 from windshield 200.

Elastomeric load isolator 420 may be made from any suitable material. In some embodiments, elastomeric load isolator 420 is formed from an elastomeric material. An elastomeric material is a material, such as a polymer, having the property of viscoelasticity (colloquially, "elasticity"). An example of an elastomeric material is rubber. Elastomeric materials generally have a low Young's modulus and a high yield strain when compared to other materials. Elastomeric materials are typically thermosets having long polymer chains that cross-link during curing (i.e., vulcanizing). Elastomeric materials may absorb energy during compression.

Bolt 430 may extend through the opening of fastener portion 410 and couple fastener portion 410 to body 130. Coupling fastener portion 410 to body 130 may restrain windshield 200 against body 130 without excessive clamp-up force that could cause the windshield to crack. In some embodiments, providing bolt 430 through the opening in fastener portion 410 results in torque being exerted on fastener portion 410. For example, bolt 430 may thread into fastener portion 410. As another example, bolt 430 may exert torque on fastener portion 410 when the head of bolt 430 tightens against head portion 414.

Figure 5A:
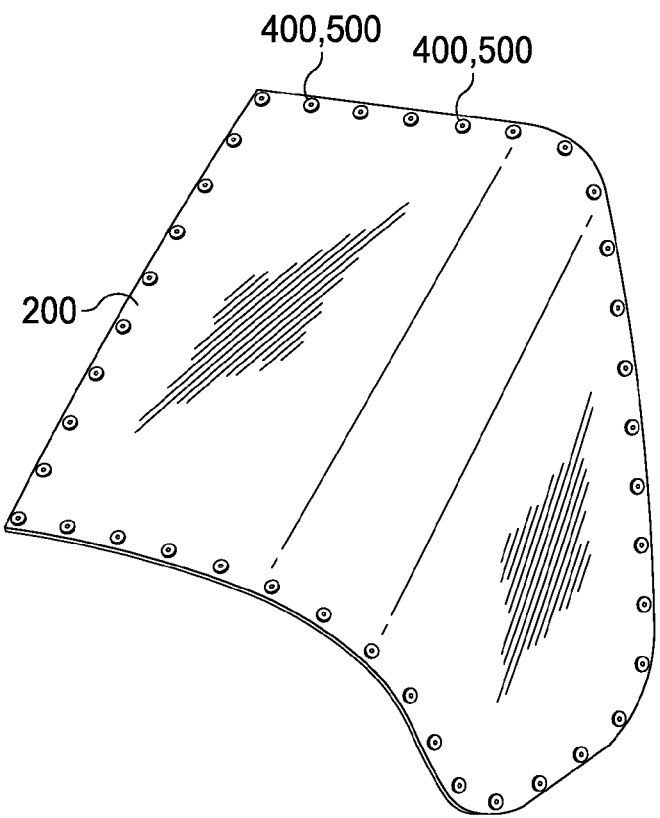
FIGS. 5A, 5B, and 5C show attachment devices 400 installed in openings 500 of windshield 200 according to one example embodiment.
Figure 5B:
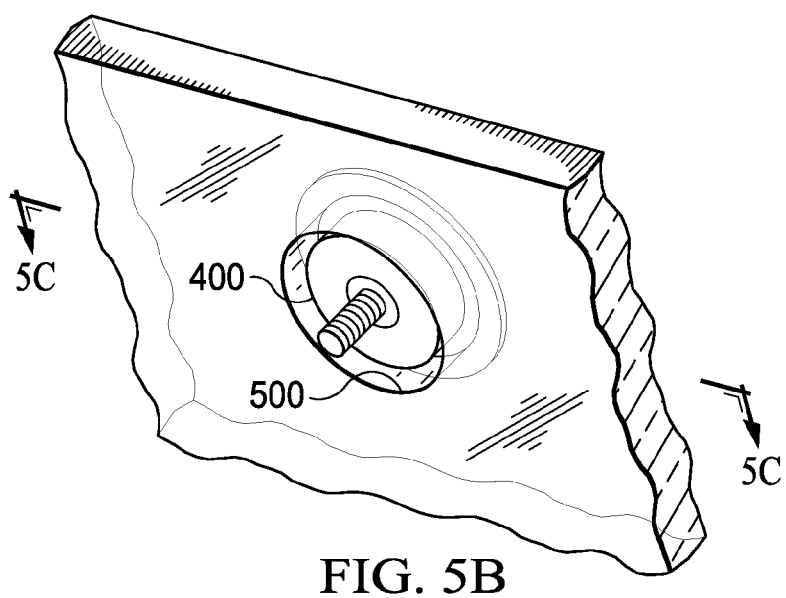
Figure 5C:
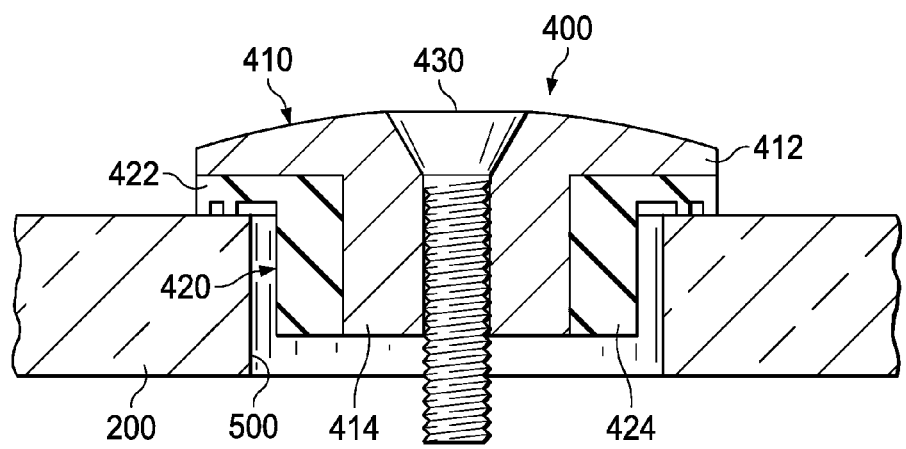

FIGS. 5A, 5B, and 5C show attachment devices 400 installed in openings 500 of windshield 200 according to one example embodiment. FIG. 5A shows a perspective view of windshield 200, FIG. 5B shows a detailed perspective view of an attachment device 400 installed in an opening 500, and FIG. 5C shows a cross-section view of the attachment device 400 of FIG. 5B installed in opening 500.

In the examples of FIG. 5A-5C, each opening 500 is larger than body portion 424 of elastomeric load isolator 420. In these examples, opening 500 is sufficiently larger than attachment device 400 such that a gap exists between elastomeric load isolator 420 and the interior surface of opening 400 when attachment device 400 is positioned through opening 500. Teachings of certain embodiments recognize that providing space between elastomeric load isolator 420 and opening 500 may help prevent damage to windshield 200. For example, providing space between elastomeric load isolator 420 and opening 500 may allow windshield 200 to flex and shift in response to thermal expansion and external forces (e.g., birdstrikes).

In this manner, windshield 200 may be fixably coupled to body 130 without necessarily being rigidly coupled to body 130. Rather, attachment devices 400 prevent windshield 200 from being removed from body 130, but windshield 200 may still be free to shift and flex in response to outside forces.

As seen in FIG. 5C, head portion 422 of elastomeric load isolator 420 is in physical contact with both windshield 200 and head portion 412 of fastener portion 410. Teachings of certain embodiments recognize that head portion 422 of elastomeric load isolator 420 may provide a seal 426 preventing debris and/or moisture from passing through opening 500. For example, as shown in FIG. 5C, head portion 422 includes a seal 426 that seals against windshield 200 and head portion 412 of fastener portion 410.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
   a body;
   a power train coupled to the body and comprising a power source and a drive shaft coupled to the power source;
   a hub;
   a rotor blade coupled to the hub;
   a front windshield comprising a plurality of windshield openings; and
   a plurality of attachment devices coupling the front windshield to the body, each attachment device positioned through one of the plurality of windshield openings, each attachment device comprising:
      a fastener portion having an opening therethrough, the fastener portion comprising a head portion and a body portion;
      a bolt extending through the opening of the fastener portion and coupling the fastener portion to the body; and
      an elastomeric load isolator surrounding at least a portion of the fastener portion and separating the fastener portion from the front windshield, the elastomeric load isolator comprising a head portion and a body portion, wherein each windshield opening is sufficiently larger than the body portions of the fastener portion and the elastomeric load isolator of each attachment device such that a gap exists between the body portion of the elastomeric load isolator and an interior surface of the windshield opening when each attachment device is positioned through one of the plurality of windshield openings.

2. The rotorcraft of claim 1, wherein the head portions of the fastener portion and the elastomeric load isolator of the attachment device are configured to lay over an outer surface of the windshield.

3. The rotorcraft of claim 1, wherein the head portion of the elastomeric load isolator is configured to separate the head portion of the fastener portion from the front windshield, the body portion of the elastomeric load isolator configured to separate the body portion of the fastener portion from an interior surface of the windshield opening.

4. The rotorcraft of claim 3, wherein the head portion of the elastomeric load isolator is in physical contact with both the front windshield and the head portion of the fastener portion.

5. The rotorcraft of claim 3, wherein the head portion of the elastomeric load isolator is configured to provide a seal preventing at least some outside debris and moisture from passing through each windshield opening.

6. The rotorcraft of claim 1, wherein:
   providing the bolt through the opening of the fastener portion results in torque being exerted on the fastener portion; and
   the elastomeric load isolator is operable to isolate at least some of the torque from the front windshield.

7. The rotorcraft of claim 1, wherein the fastener portion is plastic.

8. The rotorcraft of claim 1, wherein the fastener portion is a thermoset.

9. The rotorcraft of claim 1, wherein the fastener portion is carbon fiber.

10. A windshield attachment assembly for coupling a windshield to a body, comprising:
    a windshield comprising a windshield opening; and
    a windshield attachment device configured to be positioned through the windshield opening, the windshield attachment device comprising:
       a fastener portion having an opening therethrough, the fastener portion comprising a head portion and a body portion;
       a bolt configured to extend through the opening of the fastener portion and couple the fastener portion to the body; and
       an elastomeric load isolator surrounding at least a portion of the fastener portion and separating the fastener portion from the windshield, the elastomeric load isolator comprising a head portion and a body portion, the body portion configured to be positioned through the windshield opening wherein the body portions of the fastener portion and the elastomeric load isolator of the attachment device are sized to leave a gap between the body portion of the elastomeric load isolator and an interior surface of the windshield opening when the windshield attachment device is positioned through the windshield opening.

11. The windshield attachment assembly of claim 10, wherein the head portions of the fastener portion and the elastomeric load isolator of the attachment device are configured to lay over an outer surface of the windshield.

12. The windshield attachment assembly of claim 10, wherein the head portion of the elastomeric load isolator is configured to separate the head portion of the fastener portion from the windshield, the body portion of the elastomeric load isolator configured to separate the body portion of the fastener portion from an interior surface of the windshield opening.

13. The windshield attachment assembly of claim 12, wherein the head portion of the elastomeric load isolator is configured to be in in physical contact with both the windshield and the head portion of the fastener portion.

14. The windshield attachment assembly of claim 12, wherein the head portion of the elastomeric load isolator is configured to provide a seal preventing at least some outside debris and moisture from passing through the windshield opening.

15. The windshield attachment assembly of claim 10, wherein:
    providing the bolt through the opening of the fastener portion results in torque being exerted on the fastener portion; and
    the elastomeric load isolator is operable to isolate at least some of the torque from the windshield.

16. The windshield attachment assembly of claim 10, wherein the fastener portion is plastic.

17. The windshield attachment assembly of claim 10, wherein the fastener portion is a thermoset.

18. The windshield attachment assembly of claim 10, wherein the fastener portion is carbon fiber.

* * * * *